US012543837B2

(12) United States Patent
Mengerink et al.

(10) Patent No.: US 12,543,837 B2
(45) Date of Patent: Feb. 10, 2026

(54) SHAVING SYSTEM HAVING A SHAVING DEVICE AND A CLEANING DEVICE

(71) Applicant: KONINKLIJKE PHILIPS N.V., Eindhoven (NL)

(72) Inventors: Tim Mengerink, Leek (NL); Theodoor René Maria Hin, Emmen (NL); Greg Koutsouridis, Drachten (NL); Yogesh Dhanabalan Chandrasekaran, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 516 days.

(21) Appl. No.: 17/600,165

(22) PCT Filed: Jul. 28, 2020

(86) PCT No.: PCT/EP2020/071213
§ 371 (c)(1),
(2) Date: Sep. 30, 2021

(87) PCT Pub. No.: WO2021/023570
PCT Pub. Date: Feb. 11, 2021

(65) Prior Publication Data
US 2022/0202161 A1 Jun. 30, 2022

(30) Foreign Application Priority Data
Aug. 2, 2019 (EP) .................................... 19189767

(51) Int. Cl.
*A45D 27/46* (2006.01)
*B26B 19/14* (2006.01)
(Continued)

(52) U.S. Cl.
CPC .............. *A45D 27/46* (2013.01); *B26B 19/14* (2013.01); *B26B 19/3833* (2013.01); *B08B 3/02* (2013.01); *B08B 2203/027* (2013.01)

(58) Field of Classification Search
CPC ........ A45D 27/46; B26B 19/00; B26B 19/14; B26B 19/3806; B26B 19/3813; B26B 19/3833; B08B 3/02; B08B 2203/027
(Continued)

(56) References Cited

U.S. PATENT DOCUMENTS 3,172,416 A * 3/1965 Simmons ............... A45D 27/46 30/538
3,365,267 A * 1/1968 MeKiney et al. ........ A61L 2/00 134/111
(Continued)

FOREIGN PATENT DOCUMENTS

CN 114615909 A * 6/2022 ............. A45D 27/46
EP 3771529 A1 * 2/2021 ............. A45D 27/46
(Continued)

OTHER PUBLICATIONS

International Search Report and Written Opinion, International Application No. PCT/EP2020/071213, Mailed on Sep. 30, 2021.

*Primary Examiner* — Jason Daniel Prone

(57) ABSTRACT

A shaving system (100) includes a shaving device (12) having a shaving unit (38) and a cleaning device (14) for cleaning the shaving unit, the shaving unit having at least one hair-cutting unit (25) having an outer hair-cutting member with an annular shaving track (37) with a plurality of hair-entry openings (27) and an inner hair-cutting member rotationally arranged inside of the outer hair-cutting member. The cleaning device (14) includes a liquid-injection nozzle positioned in a receiving pit of the cleaning device for generating a jet of the cleaning liquid that, when the shaving unit is supported in a cleaning position by the cleaning
(Continued)

device, propagates directly through one or more of the hair-entry openings (27) of the shaving unit only in a single sector (41) of the annular shaving track (37) of the outer hair-cutting member (27) extending over at most one half of the annular shaving track.

12 Claims, 3 Drawing Sheets

(51) Int. Cl.
*B26B 19/38* (2006.01)
*B08B 3/02* (2006.01)

(58) Field of Classification Search
USPC ................................ 30/41; 134/166 R–168 R
See application file for complete search history.

(56) References Cited

U.S. PATENT DOCUMENTS

| | | | | |
|---|---|---|---|---|
| 4,054,963 | A * | 10/1977 | Taylor | A45D 27/46 30/41 |
| 4,838,949 | A * | 6/1989 | Dugrot | A45D 27/46 134/166 R |
| 4,910,869 | A | 3/1990 | Labrijn | |
| 5,365,958 | A * | 11/1994 | Stuhlmacher, II | A45D 27/46 134/166 R |
| 5,614,030 | A * | 3/1997 | Braun | A45D 27/46 134/22.1 |
| 6,009,622 | A * | 1/2000 | Liedblad | A45D 27/46 30/41 |
| 6,263,890 | B1 * | 7/2001 | Hoser | A45D 27/46 134/201 |
| 7,143,517 | B2 * | 12/2006 | Kappes | A45D 27/46 30/537 |
| 7,225,817 | B2 * | 6/2007 | Eichhorn | A45D 27/46 30/538 |
| 7,261,110 | B2 * | 8/2007 | Kappes | A45D 27/46 134/166 R |
| 7,316,236 | B2 * | 1/2008 | Hoser | A45D 27/46 134/166 R |
| 7,361,232 | B2 * | 4/2008 | Chasen | A45D 27/46 134/166 R |
| 7,398,786 | B2 * | 7/2008 | Eichhorn | A45D 27/46 134/11 |
| 7,409,960 | B2 * | 8/2008 | Hoser | A45D 27/46 134/182 |
| 7,588,039 | B2 * | 9/2009 | Saito | B26B 19/3833 30/41 |
| 7,625,451 | B2 * | 12/2009 | Chasen | A45D 27/46 134/22.18 |
| 7,733,058 | B2 * | 6/2010 | Takaoka | B26B 19/3833 320/114 |
| 7,909,047 | B2 * | 3/2011 | Kooijker | B26B 19/3833 134/111 |
| 7,930,836 | B2 * | 4/2011 | Ueda | A45D 27/48 34/90 |
| 8,177,918 | B2 * | 5/2012 | Schmitt | A45D 27/46 134/170 |
| 8,337,632 | B2 * | 12/2012 | Kooijker | B26B 19/3833 134/104.2 |
| 8,361,241 | B2 * | 1/2013 | Sone | A45D 27/46 134/169 R |
| 8,505,205 | B2 * | 8/2013 | Wevers | B26B 19/3833 30/41.5 |
| 8,925,209 | B2 * | 1/2015 | Van Der Scheer | B26B 19/3833 30/538 |
| 8,939,161 | B2 * | 1/2015 | Schmitt | A45D 27/46 30/538 |
| 8,955,228 | B2 * | 2/2015 | Eichhorn | B26B 19/3833 30/538 |
| 11,389,977 | B2 * | 7/2022 | Lap | A45D 27/46 |
| 11,678,731 | B1 * | 6/2023 | Howard | A45D 27/46 134/184 |
| 11,697,138 | B2 * | 7/2023 | Hayden | A45D 27/46 134/56 R |
| 11,766,793 | B2 * | 9/2023 | Lap | B26B 19/3833 30/537 |
| 2005/0126610 | A1 | 6/2005 | Hoser | |
| 2005/0189004 | A1 * | 9/2005 | Hoser | A45D 27/46 134/166 R |
| 2006/0042036 | A1 * | 3/2006 | Quinn | A45D 27/46 15/301 |
| 2006/0042103 | A1 | 3/2006 | Chasen | |
| 2006/0162749 | A1 * | 7/2006 | Saito | A45D 27/46 134/166 R |
| 2006/0283487 | A1 * | 12/2006 | Grabowski | A45D 27/46 134/135 |
| 2008/0060689 | A1 * | 3/2008 | Takizawa | A45D 27/46 134/57 R |
| 2009/0031566 | A1 * | 2/2009 | Kitamura | A45D 27/46 30/41 |
| 2009/0277024 | A1 * | 11/2009 | Sinnema | A45D 27/46 30/538 |
| 2010/0180920 | A1 * | 7/2010 | Fujimoto | A45D 27/46 134/184 |
| 2012/0217930 | A1 * | 8/2012 | Taniguchi | A45D 27/46 320/115 |
| 2013/0008030 | A1 * | 1/2013 | Fischer | A45D 27/46 30/41 |
| 2016/0235181 | A1 * | 8/2016 | Louwsma | A45D 27/46 |
| 2017/0197234 | A1 | 7/2017 | Rabie | |
| 2019/0110572 | A1 * | 4/2019 | Tomaru | B26B 19/3833 |
| 2021/0235840 | A1 * | 8/2021 | Kattan | A45D 27/46 |
| 2022/0143852 | A1 * | 5/2022 | Mengerink | B26B 19/3833 |
| 2023/0093909 | A1 * | 3/2023 | Wilson | A45D 27/46 132/292 |
| 2024/0049862 | A1 * | 2/2024 | Madarasz | A45D 27/46 |
| 2024/0130506 | A1 * | 4/2024 | Lap | B26B 19/3833 |
| 2024/0225234 | A9 * | 7/2024 | Lap | B26B 19/3833 |

FOREIGN PATENT DOCUMENTS

| | | | | |
|---|---|---|---|---|
| JP | 5011464 | B * | 2/1993 | A45D 27/46 |
| JP | 2008099723 | A | 5/2008 | |
| JP | 2010057837 | A | 3/2010 | |
| RU | 2787262 | C1 * | 1/2023 | A45D 27/46 |
| SG | 11202103172 | Y * | 4/2021 | B26B 19/3833 |
| WO | 0038890 | A1 | 7/2000 | |
| WO | 2004062420 | A2 | 7/2004 | |
| WO | 2006067667 | A1 | 6/2006 | |
| WO | 2007111254 | A1 | 10/2007 | |

* cited by examiner

SHAVING SYSTEM HAVING A SHAVING DEVICE AND A CLEANING DEVICE

CROSS-REFERENCE TO PRIOR APPLICATIONS

This application is the U.S. National Phase application under 35 U.S.C. § 371 of International Application No. PCT/EP2020/071213, filed on 28 Jul. 2020, which claims the benefit of European Patent Application No. 19189767.7, filed on 2 Aug. 2019. These applications are hereby incorporated by reference herein.

FIELD AND BACKGROUND OF THE INVENTION

The present invention relates to a shaving system comprising a shaving device having a shaving unit and a cleaning device for cleaning the shaving unit.

From WO 2006/067667 A1, a shaving system according to the introductory portion of claim 1 is known.

US 2005/0126610 A1 discloses a cleaning device for cleaning the shaving head of a shaving apparatus. The cleaning device includes a housing, a receptacle configured to receive the shaving apparatus, a receiving region configured to receive the shaving head, a reservoir for containing a cleaning fluid, a supply conduit connecting the reservoir to the receiving region, and a return conduit connecting a bottom area of the receiving portion to the reservoir. The receptacle is constructed in a trough shape to receive the shaving apparatus in a substantially horizontal position. An outlet of the supply conduit comprises a flat-jet nozzle which is directed at the shaving head. The cleaning fluid is sprayed through the flat-jet nozzle onto the upper area of the shaving head and distributed throughout the shaving head as a result of the movement of the cutter parts within the shaving head. In an embodiment two or more nozzles are arranged at selected sites to strike substantially the complete surface of the shaving head with cleaning fluid.

WO 2007/111254 A1 discloses an agent supply apparatus for supplying a treatment agent, such as a shaving lotion, to a hair removal apparatus such as an electric shaver or a depilator. The agent supply apparatus includes a support portion for supporting the hair removal apparatus and an agent supply portion for the head portion of the hair removal apparatus when supported by the support portion. The agent supply portion includes an agent container for storing the treatment agent, a pump, and an agent ejection port through which the treatment agent is ejected. The agent ejection port ejects the treatment agent obliquely upwards and rearwards and is provided at a position facing the head portion.

SUMMARY OF THE INVENTION

It is an object of the present invention to provide a cleaning device with which the at least one cutting unit can be cleaned more thoroughly and/or using less cleaning liquid and/or a cleaning liquid using less or less strong cleaning agents.

According to the present invention, this object is achieved by providing a shaving system according to claim 1.

Because the at least one injection nozzle is arranged and positioned in the receiving pit for generating a jet of cleaning liquid delivered from the conduit directly through one or more of the hair-entry openings only in a single sector of the annular shaving track of the outer hair-cutting member extending over at most one half of the annular shaving track, cleaning liquid is selectively introduced into a space inside of the outer hair-cutting member through said single sector of the annular shaving track only. This leaves a sufficiently large remaining sector of the annular shaving track via which the cleaning liquid is allowed to flow out of the space in the hair-cutting unit behind the outer hair-cutting member through hair-entry openings in said remaining sector of the annular shaving track. This in turn causes a strong current of cleaning liquid to flow through the space in the hair-cutting unit behind the outer hair-cutting member, which is particularly effective for flushing shaving debris away and entrain it out of the space in the hair-cutting unit behind the outer hair-cutting member.

Particular embodiments and features of the invention are set forth in the dependent claims and the description and shown in the drawings.

DETAILED DESCRIPTION OF THE EMBODIMENTS

Figure 1:
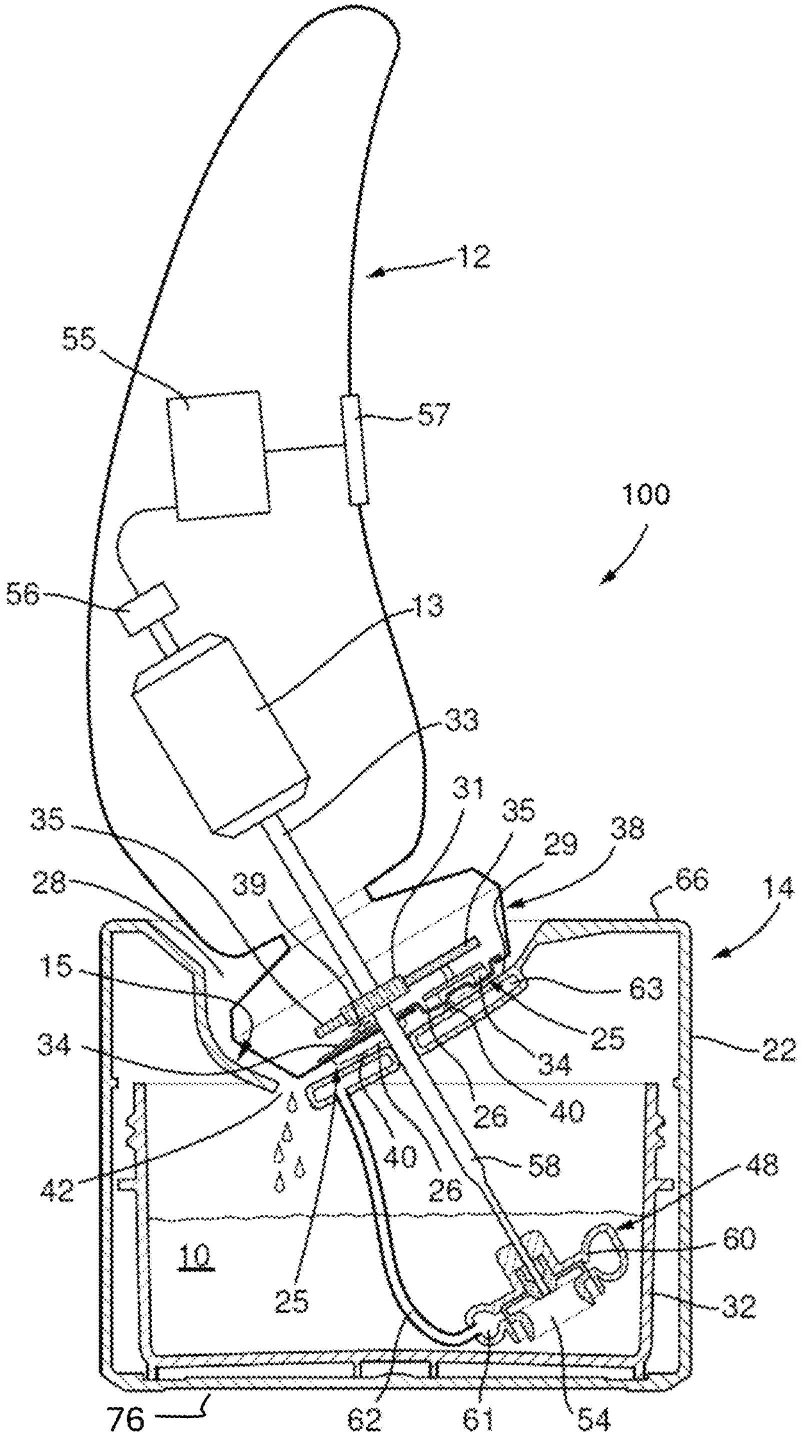
FIG. 1 is a schematic cross-sectional view of an example of a shaving system according to the invention comprising a cleaning device supporting a shaving device, shown in side view, with a shaving unit of the shaving device in a cleaning position.
Figure 2:
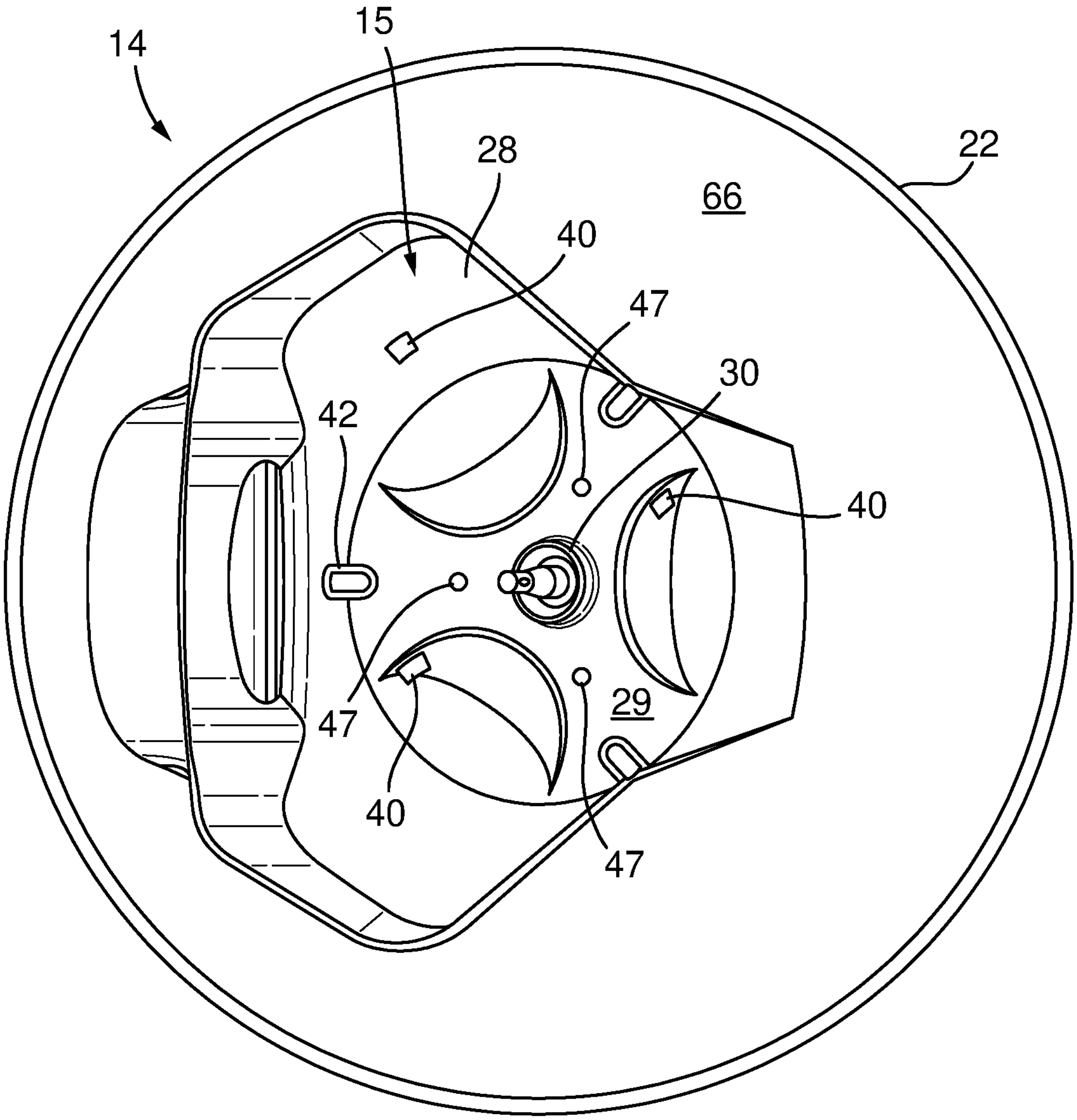
FIG. 2 is a schematic top plan view of the cleaning device shown in FIG. 1 (without the shaving device)
Figure 3:
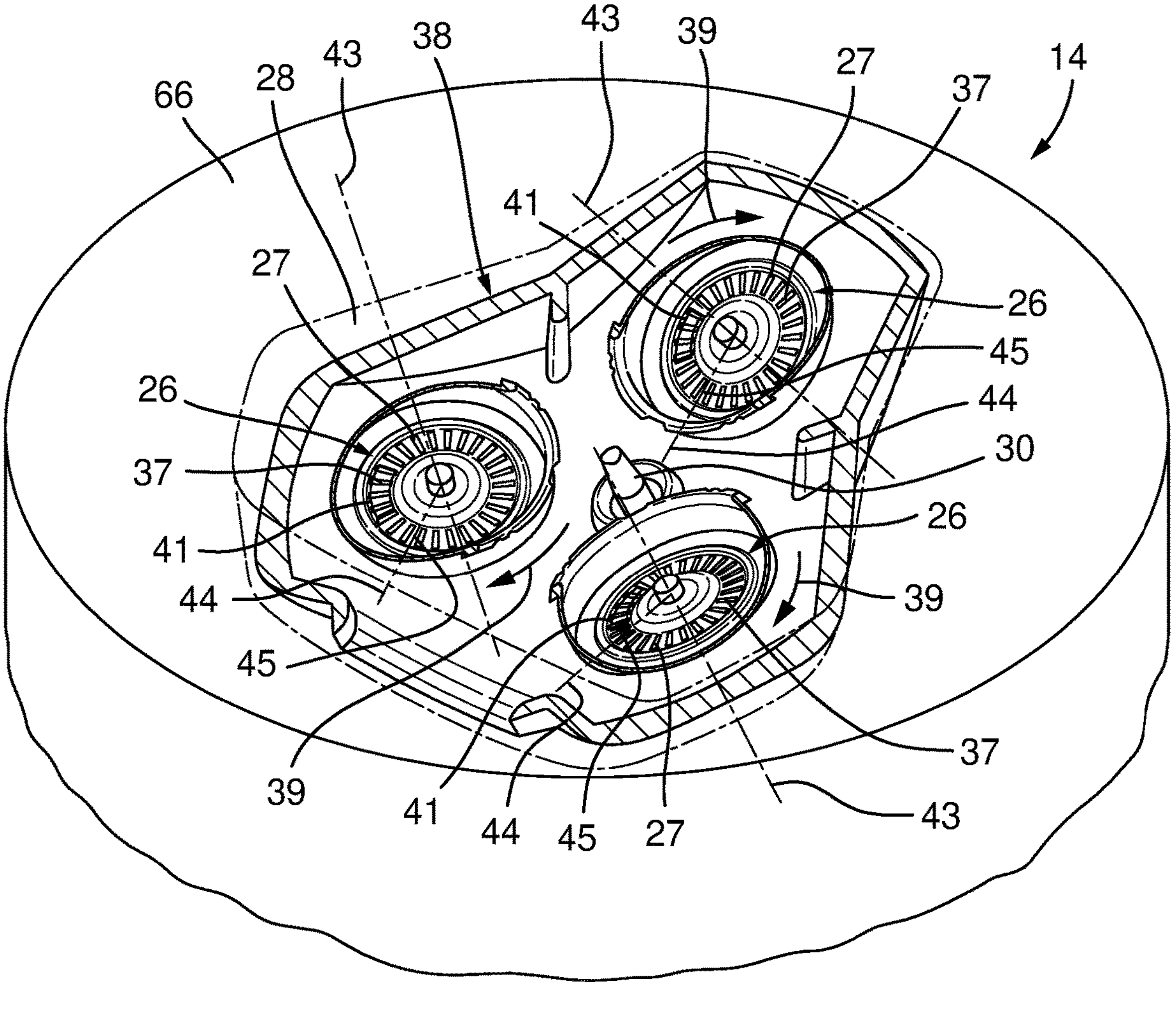
FIG. 3 is a schematic perspective view of a top portion of the cleaning device shown in FIG. 1, partially in see-through representation, with a portion of the shaving unit shown in cut-through view through a cutting plane about parallel to a shaving face of the shaving unit.

The drawings show an example of a shaving system 100 according to the invention which is composed of a shaving device 12 and a cleaning device 14 including a supporting structure 15. The cleaning device 14 has a pot-shaped housing 22 carrying the support structure 15. The housing 22 has a bottom wall 76 which defines a horizontal plane and a top wall 66 in which a generally triangular opening provides access to a receiving pit 28 forming a recess bounding a receiving space in the housing 22. The shape of the space in the receiving pit 28 corresponds to the shape of a shaving unit 38 of the shaving device 12. The shaving device 12 can be placed with its shaving unit 38 in a cleaning position in the receiving pit 28 and supported by the supporting structure 15 in the cleaning position as shown in FIGS. 1 and 3. The main body of the shaving device 12, which in this example is a housing in the shape of a handle, projects upwardly from the cleaning device 14.

A driven coupling member 30 is provided in a central position of the receiving pit 28 on a sloping bottom wall 29 thereof. When the shaving device 12 is placed with its shaving unit 38 in the cleaning position in the receiving pit 28 of the cleaning device 14, as shown in FIG. 1, then the driven coupling member 30 will be coupled with a respective driving coupling member 31 provided on the shaving unit 38 of the shaving device 12. The driving coupling member 31 is mounted to a driven end of a drive shaft 33 which is coupled to an electric motor 13 of the shaving device 12. The motor 13 is also coupled via gear wheels 35 to inner hair-cutting members in the form of rotatable cutters 34, arranged inside of the outer hair-cutting members, for driving rotation of the cutters 34 during shaving.

Within the housing 22, a container 32 containing cleaning liquid 10 is located. The container 32 may be provided in the form of a replaceable and disposable or refillable cartridge to facilitate refilling when cleaning liquid is used up. To this end an upper housing part may be removable from a lower housing part or the housing may be provided with a side opening with or without a door, via which the cartridge can be inserted and removed. The container may also be refillable via a filling opening with or without a filling valve.

A fluid pump unit 48 is located in the container 32. The fluid pump unit 48 includes a drive shaft 58 coupled to the coupling 30 and has an impeller 60 attached to a lower end of the drive shaft 58. Thus, rotating motion of the driven coupling member 30 can be transferred to the impeller 60 of the fluid pump 48. A pump chamber 61 extends around the impeller and communicates with a conduit 62. The conduit is in communication with a plenum chamber 63 under the bottom 29 of the pit 28.

When the driven coupling member 30 is driven by the shaving device 12, the impeller 60 of the fluid pump 48 is driven via the drive shaft 58. Thus the pump impeller 60 is rotated so as to draw cleaning liquid through a suction openings 54 and to pass the cleaning liquid through pump chamber 61 and conduit 62 upwardly into the plenum chamber 63. Instead of by a motor 13 of the shaving device 12, the pump may also be driven in another manner, for instance by a motor of the cleaning unit.

The shaving unit 38 of the shaving device 12 has three hair cutting units 25. Each hair-cutting unit 25 has an outer hair-cutting member in the form of a cutting cap 26 and a respective internal hair-cutting member—in this example cutter 34. Each cutter 34 has a plurality of circumferentially distributed cutting edges arranged to move along an inner surface of the respective cutting cap 26 for cutting off hairs projecting through hair-entry openings 27 in the cutting cap 26 at sharp edges of the hair-entry openings 27. The hair-entry openings 27 are arranged evenly distributed in circumferential sense in a circle in an annular shaving track 37 along which the cutting edges of inner cutters 34 are rotatable in a rotational direction 39.

For delivering cleaning liquid 10 into the receiving pit 28, injection nozzles 40 communicating with the conduit 62 and the pump unit 48 are arranged and positioned in the receiving pit 28 for directing cleaning liquid delivered from the conduit 62 via the plenum chamber 63 directly to the cutting units 25 of the shaving device 12, when the shaving unit is in the cleaning position. Via the conduit, 62, the plenum chamber 63 and the injection nozzles 40, the pump unit 48 can pump the cleaning liquid 10 from the reservoir 32 to the receiving pit 28.

In an alternative embodiment, instead of being distributed to the injection nozzles 40 via a plenum chamber, the cleaning liquid may be distributed from the pump unit 48 to the injection nozzles 40 via a plurality of conduits, i.e. via separate conduits for each respective injection nozzle 40. Alternatively, the cleaning liquid may be distributed from the pump unit 48 to the injection nozzles by, successively, a main conduit and a plurality of branches of the main conduit, i.e. via separate branches for each respective injection nozzle.

The injection nozzles 40 are arranged and positioned in the receiving pit 28 for forming a jet of cleaning liquid delivered from the conduit 62 via the plenum chamber 63 directly through one or more of the hair-entry openings 27 only in a single sector 41 of the annular shaving track 37 extending over at most one half of the annular shaving track 37.

Because the injection nozzles 40 are arranged and positioned in the receiving pit 28 for each forming a jet of cleaning liquid 10 directly through one or more of the hair-entry openings 27 only in said single sector 41 of the annular shaving track 37 of each cutting unit 25, cleaning liquid is selectively introduced into a space inside of the cutting cap 26 only through one or more hair-entry openings 27 in said single sector 41 of the annular shaving track 37. This allows the cleaning liquid 10 to flow out of the spaces in the hair-cutting units 25 behind the cutting caps 26 through hair-entry openings 27 in the remaining other sector of each of the annular shaving track 37. This in turn causes strong currents of cleaning liquid to flow through the spaces in the hair-cutting units 25 behind the cutting caps 26, which is particularly effective for flushing shaving debris away and entrain it out of the space in the hair-cutting units 25 behind the cutting caps 26. As is illustrated in FIG. 1, cleaning liquid entraining shaving debris and other particles and substance flushed out of the hair-cutting units 25 that drips out of the hair-cutting units 25 is drained back into the container 32 via a drainage opening 42 in the bottom 29 of the receiving pit 28.

According to the invention, the sector in which the cleaning liquid is injected in the or each hair-cutting unit is a single sector 41 extending over at most one half of the annular shaving track 37. This leaves a sufficiently large remaining sector of the annular shaving track 37, via which cleaning liquid can flow out of the or each hair-cutting unit after the cleaning liquid has flowed inside the or each hair-cutting unit over a relatively large distance, which is advantageous for obtaining an powerful flow of cleaning liquid through the or each hair-cutting unit.

For obtaining a powerful flow of cleaning liquid through the or each hair-cutting unit, it is advantageous that, as in the present example, the supporting structure 15 is arranged for supporting the shaving device 12 such that the or each hair-cutting unit in the cleaning position is oriented with the annular shaving track 37 extending along a plane oriented obliquely relative to a horizontal plane. Thus, the annular shaving track 37 is sloping, which causes cleaning liquid flow inside the or each hair-cutting unit to be driven by gravity as well.

This effect is further enhanced because the sector 41 via which cleaning liquid is injected extends only outside an angular range of the annular shaving track 37 extending 30° about a central axis 43 of the annular shaving track 37 at both sides of a median line (midline) 44 of the annular shaving track 37 which extends through a lowermost point 45 of the annular shaving track 37. This leaves the hair-entry openings 27 in at least a lowermost sector of 60° of the annular shaving track 37 free for outflow of cleaning liquid. Thus, outflow through the hair-entry openings 27 in a lower portion of the hair cutting unit 25, towards which cleaning liquid tends to flow, is not hindered by inflow in that lower portion of the hair cutting unit 25.

For further enhancing the cleaning and rinsing effect of the cleaning liquid, it is preferred that the internal cutters 34 are rotated during cleaning of the shaving device 12. In the present example, this is achieved automatically, because the pump 48 is driven by the same motor 13 as the cutters 34 and both the pump 48 and the cutters 34 are simultaneously coupled to the motor 13.

When the cutters 34 are being rotated in the rotational direction 39 about the central axis 43, cleaning liquid 10 is flushed through the cutting units 25 of the cleaning device particularly effectively, because in each cutting unit 25 the sector 41, via which cleaning liquid is injected into the hair-cutting unit via hair-cutting openings 27, extends only in an angular range of the annular shaving track 37 extending between 30 and 90° from the median line 44 of the annular shaving track 37 extending through the lowermost point 45 of the annular shaving track 37, seen in the rotational direction 39 of the cutter 34 about the central axis 43. A large portion of the injected cleaning liquid is then first entrained uphill by the rotating cutter 34 and only leaves the hair-cutting unit 25 as it has reached lower portions of the annular shaving track 37. For this effect to occur particularly strongly, it is advisable that the sector 41 via which cleaning liquid is injected into the hair-cutting unit via hair-cutting openings 27 extends only in an angular range, seen in the rotational direction 39, of 40-80°, and yet more preferably 50-70°, from the median line 44 of the annular shaving track 37 extending through the lowermost point 45 of the annular shaving track 37.

The main body of the shaving device 12 is elongate in a direction oblique to the plane in which the annular shaving track 37 extends, such that a portion of the annular shaving track 37 is more remote from a most opposite end of the main body than an opposite portion of the annular shaving track 37. The supporting structure 15 and the shaving device 12 are arranged such that, when the shaving unit 38 is supported in the cleaning position, the plane in which annular shaving track 37 extends is obliquely oriented with respect to a horizontal plane, such that said portion of the annular shaving track 37, which is more remote from the most opposite end of the main housing part than said opposite portion of the annular shaving track 37, is positioned at a lower level than said opposite portion of the annular shaving track 37. When the shaving device 12 is supported with the shaving unit 38 in the cleaning position, this causes the direction in which the main body of the shaving device 12 is elongate to be oriented more vertical than if the shaving device 12 would be supported with the annular shaving track 37 extending in a horizontal plane, so the shaving device 12 is better balanced when it is supported with the shaving unit in the cleaning position than if the shaving device 12 would be supported with the annular shaving track 37 extending in a horizontal plane. Moreover, a better view on an operating interface 57 of the shaving device 12 is obtained than if the shaving device 12 would be supported with the annular shaving track 37 extending in a horizontal plane. The operating interface 57 is located on a side of the main body facing in the same direction as the general direction in which outer surfaces of the shaving units 25 are tilted relative to a plane perpendicular to the direction in which the main body is elongate. By orienting the direction in which the main body is elongate more vertically, the operating interface 57 faces in a direction which is oriented less downwardly or even horizontally or slightly upwardly.

Preferably, the obliqueness of the plane in which the annular shaving track 37 extends relative to a horizontal plane and the obliqueness of the plane in which the annular shaving track 37 extends relative to the direction in which the main body is elongate are such that the direction in which the main body is elongate is about vertical when the shaving unit 38 is supported in the cleaning position.

As a result of the use of the injection nozzles 40, a uniform and thorough cleaning of all hair-cutting units 25 of the shaving unit is achieved, despite the oblique orientation of the shaving unit in the receiving pit 28. A much less uniform cleaning of all hair-cutting units 25 would be achieved when the shaving unit would be placed in an oblique orientation in a receiving space of a prior art cleaning device, wherein the receiving space is filled with the cleaning fluid and wherein the shaving unit is merely immersed as a whole in the cleaning fluid.

When cleaning is completed, it is generally appreciated if the shaving unit 38 is clean on the outside as well and in particular that no residue of shaving debris flushed out of the hair-cutting units 25 is left on the outside of the hair-cutting units 25. In the present example, this has been achieved by providing, in addition to the injection nozzles 40, rinsing nozzles 47 communicating with the pump 48 and the conduit 62 and arranged for rinsing in particular a portion of an outer surface of the shaving unit 38 centrally arranged between the hair-cutting units 25. The rinsed outer surface of the shaving unit 38 may also include portions of the outer surfaces of the cutting caps 26 in each of which a lowermost sector of the circle of the hair-entry openings 27 is located, so that shaving debris flushed out of the interiors of the hair-cutting units 25 is reliably rinsed away from the outside of the shaving unit 38 as well.

In the present example, the shaving device 12 has a shaving unit 38 with three hair-cutting units 25 and the cleaning unit 14 has three injection nozzles 40, each of the injection nozzles 40 being arranged and positioned in the receiving pit 28 for spraying cleaning liquid delivered from the conduit directly through one or more of the hair-entry openings 27 only in a sector of the annular shaving track 37 of an associated one of the hair-cutting units 25. Thus, the cleaning effect is evenly distributed over the hair-cutting units 25.

For an evenly distributed cleaning effect, it is further advantageous if, as in the present example, the shaving device 12 has three of the hair-cutting units 25 arranged in a tri-angular configuration, and the cleaning device has three of the injection nozzles 40 arranged in a triangular configuration corresponding to the triangular configuration of the hair-cutting units 25.

For injecting cleaning liquid into the hair-cutting units 25 with high power and precision, the injection nozzles 40 are arranged in or mounted to a bottom wall 29 of the receiving pit 28.

The shaving device 12 has, in the main body to which the shaving unit 38 is mounted, a control unit 55 coupled to a motor controller 56 and to the operating interface 57. The control unit 55 is arranged for, in response to a command to start a cleaning cycle inputted through the operating interface 57, controlling the motor controller 56 to control the motor 13 for driving of the pump 48 according to a pump program. This may for instance involve a sequence of periods in which the motor 13 is activated, interrupted by pauses for allowing shaving debris to be soaked, to further enhance the cleaning effect of flushing.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. For instance, the cleaning unit can be arranged for cleaning shaving units with a different number of cutting units, e.g. one, two, four or more cutting units. Also, it is conceivable to position only the shaving unit of the shaving device is in the cleaning position during cleaning, the main housing portion being temporarily dismounted from the shaving unit.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A shaving system comprising a shaving device having a shaving unit and a cleaning device for cleaning the shaving unit, the shaving unit comprising at least one hair-cutting unit having:

- an outer hair-cutting member comprising an annular shaving track with a plurality of hair-entry openings; and
- an inner hair-cutting member rotationally arranged inside of the outer hair-cutting member;

the cleaning device comprising:

- a pot-shaped housing comprising a reservoir for holding a cleaning liquid, the pot-shaped housing including a top wall, the top wall including a receiving pit for receiving at least an end portion of the shaving unit including the at least one hair-cutting unit when the shaving unit is in a cleaning position;
- a supporting structure extending downwardly from the top wall of the pot-shaped housing to at least partially define the receiving pit, the supporting structure for supporting the shaving unit in the cleaning position;
- a pump and a conduit within the reservoir of the pot-shaped housing for transporting the cleaning liquid from the reservoir to the receiving pit; and
- a plurality of liquid-injection nozzles each communicating with the conduit and the pump and arranged and positioned in the receiving pit for directing the cleaning liquid delivered from the conduit directly to the at least one hair-cutting unit of the shaving unit when the shaving unit is supported in the cleaning position by the supporting structure;
- wherein each of the plurality of liquid-injection nozzles is arranged and positioned in the receiving pit for generating a respective jet of the cleaning liquid that, when the shaving unit is supported in the cleaning position by the supporting structure, propagates directly into the at least one hair-cutting unit of the shaving unit through one or more of the hair-entry openings of the at least one hair-cutting unit which are present in a sector of the annular shaving track of the outer hair-cutting member of the at least one hair-cutting unit, and that does not propagate into the at least one hair-cutting unit of the shaving unit through other ones of the hair-entry openings of the at least one hair-cutting unit which are present outside of said sector of the annular shaving track, said sector extending about a central axis of the annular shaving track over an angle of at most 180°.

2. A shaving system as claimed in claim 1, wherein the pot-shaped housing further includes a bottom wall extending in a horizontal plane, and the supporting structure is arranged for supporting the shaving unit such that, when the shaving unit is supported in the cleaning position, a plane extending perpendicularly to the central axis of the annular shaving track is obliquely oriented with respect to the horizontal plane.

3. A shaving system as claimed in claim 2, wherein, when the shaving unit is supported in the cleaning position by the supporting structure, the sector does not extend within an angular range of 60° of the annular shaving track, said angular range extending over an angle of 30° about the central axis of the annular shaving track at both sides of a median line of the annular shaving track which extends through a lowermost point of the annular shaving track.

4. A shaving system as claimed in claim 3, wherein, when the shaving unit is supported in the cleaning position by the supporting structure, the sector extends only within an angular range of the annular shaving track which extends, in a rotational direction of the inner cutting member, from an angle of 30° from said median line to an angle of 90° from said median line about the central axis of the annular shaving track.

5. A shaving system as claimed in claim 2, wherein:

- the shaving device has a main body to which the shaving unit is mounted;
- the main body is elongate in a direction oblique to the plane extending perpendicularly to the central axis of the annular shaving track;
- the supporting structure and the shaving device are configured such that, when the shaving unit is supported in the cleaning position, the plane extending perpendicularly to the central axis of the annular shaving track is obliquely oriented with respect to the horizontal plane in which the bottom wall of the pot-shaped housing extends.

6. A shaving system as claimed in claim 5, wherein the main body of the shaving device accommodates a motor, and wherein the supporting structure of the cleaning device is adapted to support the main body in the cleaning position of the shaving unit.

7. A shaving system as claimed in claim 6, wherein the main body of the shaving device further accommodates a control unit configured and arranged for controlling the driving of the pump according to a pump program.

8. A shaving system as claimed in claim 7, wherein the main body of the shaving device comprises a user interface coupled to the control unit by means of which a user of the shaving system can activate the pump program.

9. A shaving system as claimed in claim 1, wherein the cleaning device comprises a bottom wall engaging the supporting structure, the bottom wall defines a portion of the receiving pit, and the least on liquid-injection nozzle is arranged in or mounted to the bottom wall.

10. A shaving system as claimed in claim 1, wherein the at least one hair-cutting unit is at least two hair-cutting units, each of said liquid-injection nozzles being arranged and positioned in the receiving pit for generating a jet of the cleaning liquid that, when the shaving unit is supported in the cleaning position by the supporting structure, propagates directly through one or more of the hair-entry openings of the annular shaving track of the outer hair-cutting member of a respective one of the at least two hair-cutting units which are present only in a sector of the annular shaving track extending about a central axis of the annular shaving track over an angle of at most 180°.

11. A shaving system as claimed in claim 10, wherein the at least two hair-cutting units is three hair-cutting units arranged in a tri-angular configuration, and wherein the plurality of liquid-injection nozzles is three liquid-injection nozzles arranged in a triangular configuration corresponding to the triangular configuration of the hair-cutting units.

12. A shaving system as claimed in claim 10, further comprising at least one rinsing nozzle arranged and positioned in the receiving pit, the at least on rinsing nozzle communicating with the pump and the conduit and arranged for rinsing a portion of an outer surface of the shaving unit centrally arranged between the at least two hair-cutting units.

* * * * *